(12) United States Patent
Huang et al.

(10) Patent No.: US 10,128,657 B2
(45) Date of Patent: Nov. 13, 2018

(54) SYSTEM FOR TRANSMITTING ELECTRICAL POWER

(71) Applicant: SIEMENS AKTIENGESELLSCHAFT, Munich (DE)

(72) Inventors: Hartmut Huang, Erlangen (DE); Peter Menke, Oberfuellbach (DE); Karlheinz Springer, Dettenheim (DE); Michael Weinhold, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 313 days.

(21) Appl. No.: 15/027,786

(22) PCT Filed: Oct. 7, 2013

(86) PCT No.: PCT/EP2013/070808
§ 371 (c)(1),
(2) Date: Apr. 7, 2016

(87) PCT Pub. No.: WO2015/051817
PCT Pub. Date: Apr. 16, 2015

(65) Prior Publication Data
US 2016/0254668 A1 Sep. 1, 2016

(51) Int. Cl.
*H02J 7/00* (2006.01)
*H02J 3/36* (2006.01)
(Continued)

(52) U.S. Cl.
CPC ............ *H02J 3/36* (2013.01); *H02J 3/34* (2013.01); *H02J 3/386* (2013.01); *H02M 7/06* (2013.01);
(Continued)

(58) Field of Classification Search
CPC ..... Y02E 10/763; Y02E 10/723; Y02E 10/725; H02J 3/386
See application file for complete search history.

(56) References Cited

U.S. PATENT DOCUMENTS

| | | | |
|---|---|---|---|
| 4,389,606 A * | 6/1983 | Detering ................ | H02P 25/03 318/712 |
| 2003/0015876 A1 | 1/2003 | Ichinose et al. | |

(Continued)

FOREIGN PATENT DOCUMENTS

| | | |
|---|---|---|
| EP | 1022838 A2 | 7/2000 |
| WO | 2005096467 A1 | 10/2005 |

OTHER PUBLICATIONS

Leonhard, W., "Electrical Engineering between Energy and Information", The Third International Power Electronics and Motion Control Conference, Aug. 15-18, 2000, pp. 197-202, vol. 1, Piscataway, NJ, USA.

(Continued)

*Primary Examiner* — Sibin Chen
(74) *Attorney, Agent, or Firm* — Laurence Greenberg; Werner Stemer; Ralph Locher

(57) ABSTRACT

A system transmits electrical power between a first and a second alternating voltage network. A self-commutated converter can be connected to the second alternating voltage network, the converter being connected to an unregulated rectifier via a direct voltage connection. The unregulated rectifier can be connected to the first alternating voltage network on an alternating voltage side. The system has a network generation device, which can be connected to the first alternating voltage network and is provided for generating an alternating voltage in the first alternating voltage network. The network generation device is configured to exchange reactive power and active power with the first alternating voltage network. Furthermore, a method is pro- (Continued)

vided which stabilizes a network frequency of the first alternating voltage network, in which the network frequency in the first alternating voltage network is regulated by changing a voltage at the direct voltage terminal of the self-commutated converter.

12 Claims, 2 Drawing Sheets

(51) Int. Cl.
   *H02J 3/34* (2006.01)
   *H02J 3/38* (2006.01)
   *H02M 7/06* (2006.01)
   *H02M 7/483* (2007.01)

(52) U.S. Cl.
   CPC .... *H02M 2007/4835* (2013.01); *Y02E 10/763* (2013.01); *Y02E 60/60* (2013.01)

(56) References Cited

U.S. PATENT DOCUMENTS

| | | |
|---|---|---|
| 2007/0085421 A1 | 4/2007 | Drubel |
| 2012/0146423 A1* | 6/2012 | Bodewes ............... H02M 7/49 307/84 |
| 2014/0110941 A1* | 4/2014 | Kjær et al. ........... F03D 7/0264 290/44 |
| 2014/0268926 A1* | 9/2014 | Gupta .................... H02M 5/44 363/35 |
| 2015/0105923 A1* | 4/2015 | Beekmann ............... H02J 3/24 700/287 |

OTHER PUBLICATIONS

Bernal-Perez, S., et al, "Off-shore Wind Farm Grid Connection using a Novel Diode-Rectifier and SC-Inverter based HVDC Transmission Link", IECON 2011—37th Annual Conference on IEEE Industrial Electronics Society, pp. 3186-3191.

* cited by examiner

SYSTEM FOR TRANSMITTING ELECTRICAL POWER

BACKGROUND OF THE INVENTION

Field of the Invention

The invention relates to a system for transmitting electrical power between a first and a second alternating voltage network. A self-commutated converter is connectable to the second alternating voltage network and connected to an unregulated rectifier via a direct voltage link. The unregulated rectifier is connectable to the first alternating voltage network on the alternating voltage side.

The invention also relates to a method for the stabilization of a network frequency in the first alternating voltage network in the system for transmitting electrical power.

Systems of the above-mentioned type are known from the prior art. For example, the article by S. Bernal-Perez et al., "Offshore Wind Farm Grid Connection using a Novel Diode-Rectifier and VSC-Inverter based HVDC Transmission Link", IECON, 2011, pages 3186-3191 discloses an energy transmission system for use in wind power installations. The energy transmission system comprises an unregulated converter, configured as a diode rectifier which, on the direct voltage side, is connected to a direct voltage intermediate circuit. The direct voltage intermediate circuit extends from the diode rectifier to a voltage injection converter, also described in English as a voltage source converter (VSC). The unregulated rectifier is connected via transformers and an alternating voltage network to a wind farm of the wind turbine installation. For the purposes of reactive power compensation, passive filter elements are connected to the alternating voltage network of the wind farm.

The transmission of electrical energy in the form of direct current is economically advantageous in many applications, particularly for transmission spans of several hundred kilometers.

Applications of this type include, for example, the previously-described connection of offshore wind farms to a land-based supply network, the supply of energy to offshore installations (for example oil platforms) from the shore, or the connection of two land-based networks which are separated by a stretch of water.

In direct current transmission systems, two self-commutated converters are used in many cases, which are interconnected by means of a direct voltage link. An arrangement of this type permits a bidirectional power flux, even between low-capacity alternating voltage networks, such that, for example, a low-capacity alternating voltage network can be stabilized by a high-capacity alternating voltage network.

Self-commutated converters also permit the "black start" of alternating voltage networks. For the start-up of the wind farm, for example, an alternating voltage network is generated by the offshore converter, wherein the supply energy required for this purpose can be taken from the land-based energy supply network. Accordingly, the wind turbine installations of the wind farm can be synchronized with the existing alternating voltage network. In high winds, the desired reverse flow of power takes place, i.e. the transmission of power from the wind farm to the land-based energy supply network. At present, voltage injection and self-commutated converters (VSCs), and particularly multi-stage converters, are used as converters. However, the offshore installation of such converters is cost-intensive, on the grounds of the increasingly high weight of the converters.

Although the use of an unregulated rectifier only permits the transportation of power in one direction, this application is advantageous, in that the losses and weight of the rectifier are substantially lower, in comparison with a self-commutated converter. Moreover, relatively compact power semiconductors can be used in the unregulated rectifier. Under certain circumstances, the control and cooling of the unregulated rectifier can also be configured in a less complex manner.

Where the first alternating voltage network, for example, is connected to an energy generating installation, such as a wind farm, the direction of the power transportation is essentially predetermined, such that the restriction to unidirectional energy transmission does not constitute a severe handicap.

However, this concept has a disadvantage, in that the unregulated rectifier cannot deliver any alternating voltage to the first alternating voltage network. However, the availability of a stable-frequency alternating voltage on the alternating voltage network connected to the wind farm is a prerequisite for the operation of the system with commercially conventional wind turbines. This requisite alternating voltage cannot be delivered by an unregulated rectifier. Moreover, variations in the network frequency on the first alternating voltage network can only be inadequately controlled.

One option for surmounting this problem is the use of a specially adapted wind turbine control system. In this case, however, it would no longer be possible to use commercially available wind turbines. Accordingly, there is still a requirement for systems of the above-mentioned type, which have a stable first alternating voltage network.

BRIEF SUMMARY OF THE INVENTION

Proceeding from the prior art, the object of the invention is the proposal of a system of the type mentioned at the outset which permits the stable operation of the first alternating voltage network.

This object is solved by a system which has a network generation device, which can be connected to the first alternating voltage network. The network generation device is provided for the generation of an alternating voltage on the first alternating voltage network, wherein it is set up for the exchange of reactive power and active power with the first alternating voltage network.

A further object of the invention is the proposal of a method for the stabilization of a network frequency in the first alternating voltage network.

The object is solved by a method wherein the network frequency in the first alternating voltage network is regulated by an adjustment of a voltage at the direct voltage terminal of the self-commutated converter.

According to the invention, the network generation device generates an alternating voltage in the first alternating voltage network. The network generation device is also designed for the exchange of reactive power with the first alternating voltage network. If, for example, an energy generating installation, such as a wind farm with commercially conventional wind turbines, is connected to the first alternating voltage network, the requisite alternating voltage for the operation thereof on the first alternating voltage network, together with any reactive power required, can be delivered by the network generation device. Control of the take-up or injection of the requisite active power and reactive power by the network generation device is preferably effected by a control unit provided for this purpose on the network generation device.

By means of the method according to the invention, the frequency stability of the alternating voltage on the first alternating voltage network can be maintained. For example, where more active power is injected into the first alternating voltage network, this may result in variations in the network frequency on the first alternating voltage network. In order to counteract, for example, an increase in the network frequency, the voltage on the direct voltage terminal of the self-commutated converter is reduced.

This results in an increased power flux from the first to the second alternating voltage network. In this way, the network frequency on the first alternating voltage network can be regulated to a predetermined value. A corresponding procedure can be applied in case of a drop in the network frequency, whereby the voltage on the direct voltage terminal of the self-commutated converter is raised, thereby reducing the power flux from the first to the second alternating voltage network.

The unregulated rectifier is preferably a diode rectifier. In practice, diode rectifiers have proven to be particularly compact and cost-effective, both in production and in service.

The system according to the invention is particularly suitable for applications in which electrical energy generated in offshore wind turbine installations is to be transmitted to a land-based energy supply network. The unregulated rectifier may thus be connected, for example, via the first alternating voltage network to a wind farm arranged in a lake or sea. As the transmission of energy to shore, in this case, is executed via a direct voltage link, the unregulated rectifier is preferably arranged on an offshore platform. Correspondingly, the self-commutated converter is arranged onshore.

In the first alternating voltage network, the alternating voltage required for the start-up of the wind turbines is supplied by the network generation device. To this end, the network generation device may comprise, for example, a rotating phase shifter, for example in the form of a synchronous motor. The phase shifter can tap active power from the first alternating voltage network, which is then buffered in the form of rotational energy. To this end, the phase shifter has a rotating mass, for example in the form of a solid rotor. Correspondingly, the phase shifter can inject active power into the first alternating voltage network, wherein the active power delivered over time is taken from the stored rotational energy.

In this case, the rotational energy stored in the phase shifter at a given time influences the network frequency on the first alternating voltage network. If energy is received by the phase shifter, the speed of rotation of the rotating mass increases accordingly, wherein the network frequency on the first alternating voltage network is correlated to the speed of rotation. In order to compensate a variation in the network frequency, a voltage on the direct voltage terminal of the self-commutated converter may be increased or reduced. In this way, the power flux between the unregulated rectifier and the self-commutated converter can be regulated: in the event of a rise in the network frequency on the first alternating voltage network, the voltage on the direct voltage terminal of the self-commutated converter is reduced, such that more active power is drawn from the first alternating voltage network, thereby reducing the network frequency; correspondingly, the voltage on the direct voltage terminal of the self-commutated converter is increased, in case of a drop in the network frequency on the first alternating voltage network.

It may be appropriate that the network generation device comprises a static-synchronous-compensator (STATCOM) device. The STATCOM device possesses an alternating voltage terminal, by means of which the STATCOM device may be connected, for example, to the three phases of the alternating voltage network. By means of the STATCOM device, inductive and/or capacitive reactive power may be exchanged between the STATCOM device and the alternating voltage network. Appropriately, the STATCOM device is set up for the generation of reactive power, which is not dependent upon the voltage on the alternating voltage network. The STATCOM device may be configured, for example, as a "voltage source converter", which is connected to the first alternating voltage network via an inductance. In principle, any inductive component such as, for example, a coil or a transformer, may be considered as the inductance. The STATCOM device may be configured, for example, as a modular multi-stage converter (multi-level converter) with distributed storage capacitors. In this case, the STATCOM device comprises phase modules, the number of which corresponds to the number of phases on the first alternating voltage network, wherein the phase modules are interconnected, for example, in a star-connected circuit or delta-connected circuit. Each phase module is thus configured as a series circuit of two-pole sub-modules. Each sub-module is equipped with an energy storage device such as, for example, a single-pole capacitor, and a power semiconductor circuit arranged in parallel thereto. The power semiconductor circuit may be configured, for example, as a half-bridge or full-bridge circuit. In this case, the network generation device also comprises an energy storage element for the delivery of any active power required, for example in the form of a rechargeable battery. The energy storage element may be connected, for example, in parallel with an intermediate circuit capacitor on the direct voltage injection converter. The energy storage element can generally only take up and/or deliver a limited quantity of energy. For this reason, in the interests of the frequency stability of the network frequency on the first alternating voltage network, the power flux between the first and second alternating voltage network is regulated by adjusting the voltage on the direct voltage terminal of the self-commutated converter.

It is also conceivable that the network generation device is equipped with a suitably installed flywheel which will already be familiar to the specialist. In a similar manner to the rotating phase shifter, the flywheel can buffer and/or deliver active power in the form of rotational energy.

The network generation device may also have at least one switching element, wherein the energy storage element may be isolated from the remaining parts of the network generation device by means of the switching element.

The network generation device may be arranged at any appropriate location in the vicinity of the first alternating voltage network. In a wind farm application, for example, the network generation device may be arranged on an offshore platform which is rigged in the sea together with the unregulated rectifier, wherein the network generation device and the rectifier may also be arranged on two or more spatially separated platforms. In this case, it is also conceivable for the network generation device to be fitted to one of the supports of the wind turbine installation.

In some applications, it may be appropriate for the system to be equipped with an auxiliary energy supply unit for the alternative supply of energy to the network generation device, for example for the charging of the energy storage element. In wind farm applications, the auxiliary energy supply unit can supply energy to the network generation device during periods of light wind. Energy is delivered, for example, by means of an auxiliary generator, for example a diesel generator. However, energy may also be delivered from the shore, via the existing direct voltage link and an additional self-commutated inverter with a significantly lower voltage, wherein the additional inverter is disconnectable from the transmission path by means of switches. Alternatively, energy may also be delivered from the shore by means of a dedicated direct current transmission link provided for this purpose and the additional inverter. It is also conceivable for energy to be delivered from the shore via the direct voltage link and via a switchable component which is incorporated in the unregulated rectifier or even via an additional alternating voltage line such as, for example, a parallel cable on shore or connected to a further wind farm.

The self-commutated converter may appropriately be a modular multi-stage converter. The modular multi-stage converter has phase modules, the number of which corresponds to the number of phases on the connected second alternating voltage network. Each phase module is for this purpose configured with three poles, and has two external direct voltage terminals and a central alternating voltage terminal. A phase module branch extends between the alternating voltage terminal and each direct voltage terminal, provided with a series circuit of two-pole sub-modules. Each sub-module is equipped with an energy storage device such as, for example, a single-pole capacitor, and a power semiconductor circuit arranged in parallel thereto. The power semiconductor circuit may be configured, for example, as a half-bridge or full-bridge circuit. The half-bridge circuit comprises a series circuit of two closeable and interruptible power semiconductor switches such as, for example, IGBTs, IGCTs or similar, wherein a freewheeling diode is connected inversely and in parallel with each closeable and interruptible power semiconductor switch. In this arrangement, a first sub-module terminal is directly connected to one pole of the energy storage device, while the other sub-module terminal is connected to the potential point between the closeable and interruptible power semiconductor switches. In a full-bridge circuit, two series circuits comprised of two closeable and interruptible power semiconductor switches respectively are provided, wherein one sub-module terminal is connected to the potential point between the closeable and interruptible power semiconductor switches on the first series circuit, and the second sub-module terminal is connected to the potential point between the closeable and interruptible power semiconductor switches on the second series circuit.

According to one embodiment of the invention, the unregulated rectifier is passively cooled, for example by air cooling, wherein the cool air can be delivered to the parts to be cooled via appropriate air ducts. In wind farm applications, the available cooling capacity is effectively correlated to the power dissipation, i.e. the quantity of heat generated in the rectifier.

Appropriately, the unregulated rectifier is connected to the offshore alternating voltage network via at least one transformer. The transformer is generally required, on the grounds that the unregulated rectifier dictates a fixed transformation ratio between the direct voltage and the alternating voltage present. It is also appropriate that a direct voltage smoothing reactor is arranged in the direct voltage link, in the immediate vicinity of the unregulated rectifier. The smoothing reactor can be used to reduce residual harmonics in the direct voltage generated at the direct voltage output of the unregulated rectifier.

The system preferably comprises a measuring device, which records the network frequency in the first alternating voltage network. A computing unit can then, for example, determine variations in frequency from the network frequency recorded continuously or at time intervals. A direct measurement of variations in network frequency in the first alternating voltage network is also conceivable. Moreover, a control device is appropriately provided, which converts the recorded network frequency, or the variations in network frequency recorded or determined, into control signals for the regulation of the voltage on the direct voltage terminal of the self-commutated converter.

The invention is described in greater detail hereinafter, with reference to an exemplary embodiment of the system according to the invention represented in FIGS. 1 and 2.

DESCRIPTION OF THE INVENTION

Figure 1:
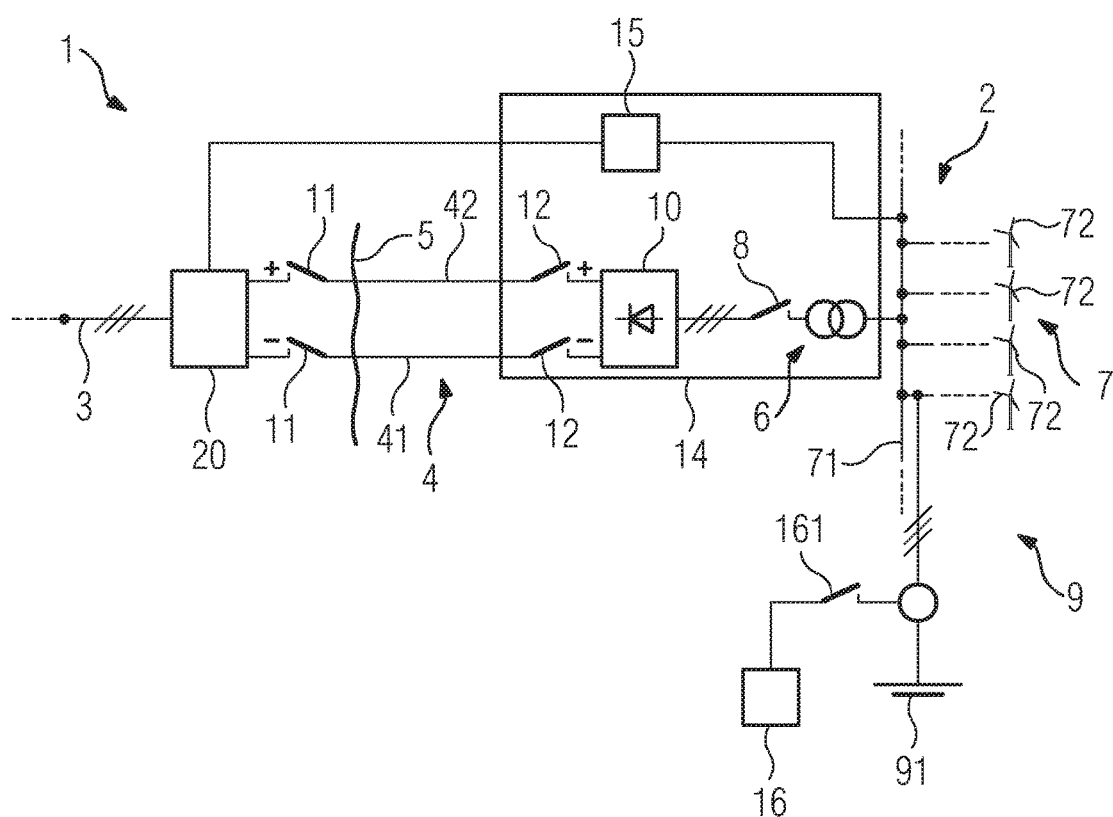
FIG. 1 shows an exemplary embodiment of an energy transmission system according to the invention.

FIG. 1 shows a schematic representation of an exemplary embodiment of the system 1 according to the invention for transmitting electrical power. The system 1 comprises a first offshore alternating voltage network 2, which is coupled to a wind farm 7 arranged in a lake or sea. The wind farm 7 comprises a number of wind turbine installations 72, which are designed for the conversion of wind energy into electrical energy. The offshore alternating voltage network 2 is configured as a three-phase system.

On the alternating voltage side, a diode rectifier 10 is connected to the offshore alternating voltage network 2. The diode rectifier 10 may be configured as a "six-pulse bridge" which is known to the specialist, or as a twelve-pulse bridge, which is also known to the specialist.

On the direct voltage side, the diode rectifier 10 is connected to a direct voltage link 4, wherein the direct voltage link 4 comprises direct voltage lines 41 and 42 with opposing polarities. From the offshore diode rectifier 10, the direct voltage link 4 is routed to shore, wherein the length of the direct voltage link 4 may range between 30 km and 100 km. In FIG. 1, the seashore is indicated by the shoreline 5.

A self-commutated converter 20 is arranged onshore and, on the direct voltage side, is connected to the direct voltage link 4. On the alternating voltage side, the self-commutated converter 20 is connected to a second onshore alternating voltage network 3. In the example shown, the onshore alternating voltage network 3 is an energy supply network, to which a plurality of consumers are connected. The direct voltage lines 41 and 42 have two direct voltage switches 11 and 12 respectively, which are designed for the interruption of the direct voltage lines 41 and 42. The direct voltage switches may be, for example, mechanical disconnectors. In the offshore alternating voltage network 3, a further switch 8 is provided, which may be used to isolate the alternating voltage network 3 from the diode rectifier 10. This switch may be, for example, a circuit-breaker.

The diode rectifier 10 is arranged on an offshore platform 14, which is rigged on the seabed.

The offshore alternating voltage network 2 also comprises a transformer 6, the primary winding of which is connected to the alternating voltage terminal of the diode rectifier 10, and the secondary winding of which is connected to a busbar 71, wherein the wind turbine installations 72 are also connected to the busbar 71.

In the system 1, only unidirectional energy transmission from the wind farm 7 to the second alternating voltage network 3 is possible. However, in particular during periods of light wind, it may become necessary for the wind farm 7 itself to be supplied with energy. As soon as energy is required by the wind farm 7, for example for the alignment of wind turbine installations or rotor blades, or for the initialization or stabilization of the first alternating voltage network 2, the power required for this purpose is delivered by the network generation device 9.

On the alternating voltage side, the network generation device 9 is connected to the alternating voltage network 2. The network generation device 9 may be connected to the alternating voltage network 3 either directly, via a transformer which is not represented diagrammatically in FIG. 1, or even via a tertiary winding of the transformer 6. The network generation device 9 comprises a "voltage source converter" 13, the internal structure of which is shown in greater detail in FIG. 2.

The network generation device 9 also comprises a rechargeable energy storage element 91 in the form of a lithium-ion battery. By means of the network generation device 9, reactive power and/or active power may be injected into the alternating voltage network 3 or tapped from the alternating voltage network 3.

An auxiliary energy supply unit 16, connected to the network generation device 9 via a switch 161, can supply the battery with alternative energy during periods of light wind. Thus, for example, by the maintenance of heating in the network generation device, humidity damage to the system can be minimized.

A measuring device 15 is set up for the recording of the network frequency in the first alternating voltage network 2, either continuously or at time intervals. From the network frequency, a computing unit can determine variations in the network frequency over time. Variations in the network frequency are delivered to a control device of the self-commutated converter 20. The control device sets the variations in network frequency into control signals for the regulation of the voltage on the direct voltage terminal of the self-commutated converter 20. In this way, for example, a rise in the network frequency in the first alternating voltage network 2 caused by increased power output from the wind turbines can be regulated by a reduction in the voltage on the direct voltage side of the converter 20, and the associated increase in the power flux from the first to the second alternating voltage network.

Figure 2:
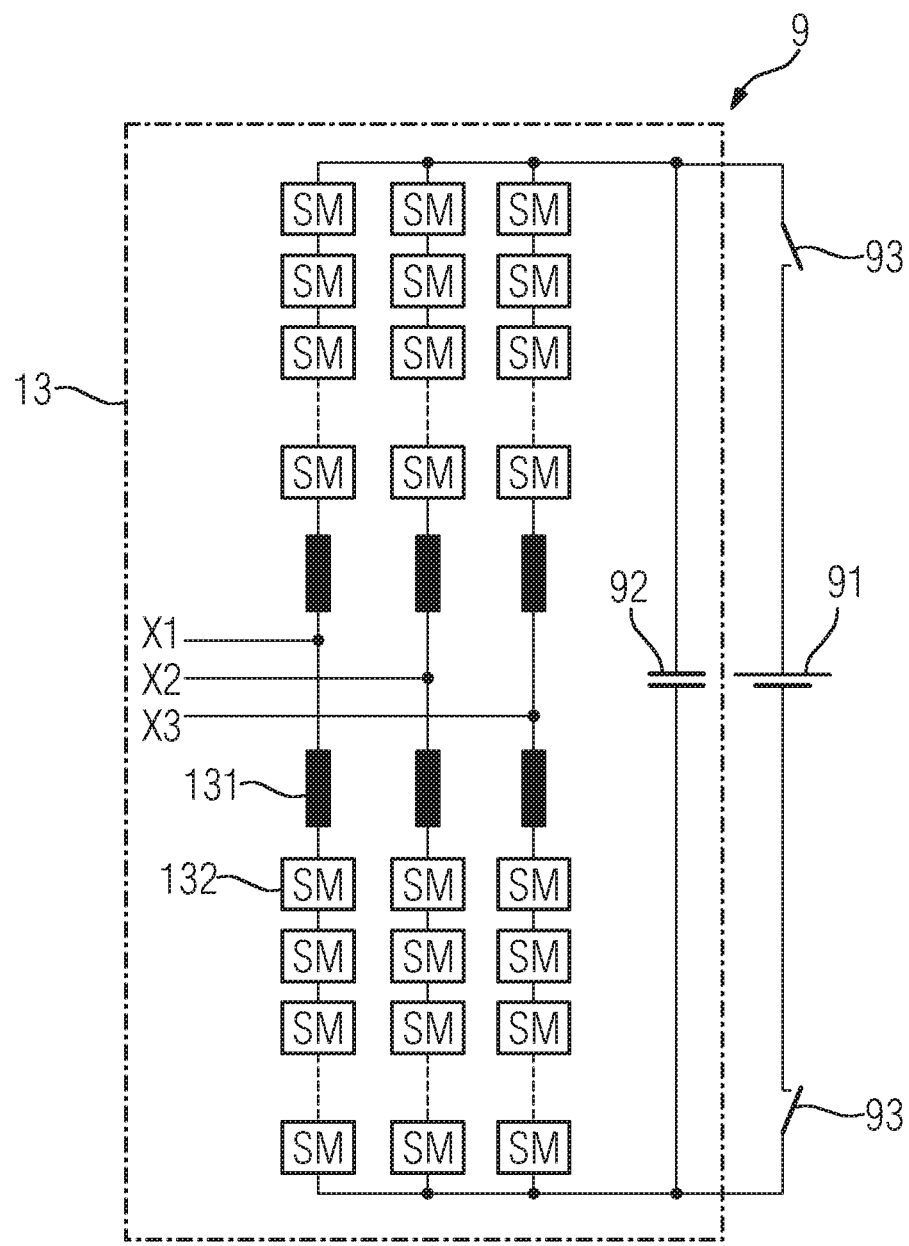
FIG. 2 shows an exemplary embodiment of a network generation device in the system according to the invention as shown in FIG. 1.

FIG. 2 is a schematic representation of the network generation device 9 for the generation of alternating voltage in the first alternating voltage network 2, as well as for voltage and frequency stabilization and reactive power compensation in the alternating voltage network 2 of the system 1 for transmitting electrical power represented schematically in FIG. 1.

The network generation device 9 comprises a converter 13. The converter 13 has three alternating voltage terminals X1, X2, X3, via which the network generation device 9 is connectable to the three phases of the offshore alternating voltage network 2. The converter 13 also has three phase modules with series-connected two-pole sub-modules 132, wherein each sub-module 132, in the exemplary embodiment shown, comprises an electronic switch and a diode connected in antiparallel thereto. In each phase module, the converter 13 also has two reactor coils 13, between which one of the alternating voltage terminals X1, X2, X3 is arranged respectively.

An intermediate circuit capacitor 92 in arranged in parallel with the phase modules. By the appropriate control of the converter 13, by means of the capacitor 92, reactive power can be exchanged with the alternating voltage network 2. The network generation device 9 also comprises a battery 91, which is connected in parallel with the intermediate circuit capacitor 92. By means of two switches 93, the battery 91 can be isolated from the converter 13. By the appropriate control of the converter 13, the battery can be employed for the exchange of active power with the alternating voltage network 2. The capacitor 92 and the battery 91 are connected to the direct voltage side of the converter 13. The switches 93 are, for example, electronic switches.

LIST OF REFERENCE NUMBERS

1 System for transmitting electrical energy
2 Second alternating voltage network
3 First alternating voltage network
4 Direct voltage link
41, 42 Direct voltage line
5 Shoreline
6 Transformer
7 Wind farm
71 Busbar
72 Wind turbine installation
8 Switch
9 Network generation device
91 Energy storage element
92 Intermediate circuit capacitor
93 Switching element
10 Unregulated rectifier
11, 12 Direct voltage switches
13 Converter
131 Reactor coil
132 Sub-module
14 Offshore platform
15 Measuring device
16 Auxiliary energy supply unit
161 Switch
X1, X2, X3 Alternating voltage terminal

The invention claimed is:

1. A system for transmitting electrical power between a first alternating voltage network and a second alternating voltage network, the system comprising:
an unregulated rectifier connectable to the first alternating voltage network on an alternating voltage side;
a direct voltage link;
a self-commutated converter connectable to the second alternating voltage network and connected to said unregulated rectifier via said direct voltage link, said self-commutated converter having a direct voltage terminal;
a network generation device connectable to the first alternating voltage network, said network generation device generating an alternating voltage in the first alternating voltage network, said network generation device is set up for an exchange of reactive power and active power with the first alternating voltage network;

a measuring device configured to record a network frequency in the first alternating voltage network; and a control device configured to convert the network frequency recorded by said measuring device into control signals for a regulation of the voltage on the direct voltage terminal of said self-commutated converter.

2. The system according to claim 1, wherein said unregulated rectifier is a diode rectifier.

3. The system according to claim 1, wherein said unregulated rectifier is connected via the first alternating voltage network to a wind farm disposed in a lake or sea.

4. The system according to claim 1, wherein said unregulated rectifier is disposed on an offshore platform, and said self-commutated converter is disposed onshore.

5. The system according to claim 1, wherein said network generation device has a rotating phase shifter.

6. The system according to claim 1, wherein said network generation device contains a static-synchronous-compensator device.

7. The system according to claim 1, further comprising an auxiliary energy supply unit for an alternative supply of energy to said network generation device.

8. The system according to claim 1, wherein said self-commutated converter is a modular multi-stage converter.

9. The system according to claim 1, wherein said unregulated rectifier has passive air cooling.

10. The system according to claim 1, further comprising at least one transformer, said unregulated rectifier is connected to the first alternating voltage network via said at least one transformer.

11. The system according to claim 1, further comprising at least one direct voltage smoothing reactor disposed in said direct voltage link.

12. A method for stabilizing a network frequency in a first alternating voltage network connected to a system for transmitting electrical power between the first alternating voltage network and a second alternating voltage network, which comprises the steps of:

providing the system with a self-commutated converter which is connectable to the second alternating voltage network and connected to an unregulated rectifier via a direct voltage link, the unregulated rectifier is connectable to the first alternating voltage network on an alternating voltage side;

providing the system with a network generation device which is connectable to the first alternating voltage network, the network generation device provided for generating an alternating voltage in the first alternating voltage network, the network generation device is set up for an exchange of active power and reactive power with the first alternating voltage network;

regulating the network frequency in the first alternating voltage network by an adjustment of a voltage at a direct voltage terminal of the self-commutated converter;

providing a measuring device which records the network frequency in the first alternating voltage network; and providing a control device which converts the network frequency recorded into control signals for a regulation of the voltage on the direct voltage terminal of the self-commutated converter.

* * * * *